(12) United States Patent
Takashima (10) Patent No.: US 10,114,791 B2
(45) Date of Patent: Oct. 30, 2018

(54) ELECTRONIC APPARATUS, CALCULATION PROCESSING METHOD, AND RECORDING MEDIUM STORING CALCULATION PROCESSING PROGRAM

(71) Applicant: CASIO COMPUTER CO., LTD., Shibuya-ku, Tokyo (JP)

(72) Inventor: Toshibumi Takashima, Kunitachi (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/010,796

(22) Filed: Jan. 29, 2016

(65) Prior Publication Data
US 2016/0275041 A1 Sep. 22, 2016

(30) Foreign Application Priority Data
Mar. 19, 2015 (JP) ................................. 2015-056876

(51) Int. Cl.
*G06F 15/02* (2006.01)
(52) U.S. Cl.
CPC .......... *G06F 15/0225* (2013.01); *G06F 15/02* (2013.01); *G06F 15/0283* (2013.01)
(58) Field of Classification Search
CPC .... G06F 15/02; G06F 15/0225; G06F 15/025; G06F 15/0283
USPC ................. 708/130, 131, 136, 160, 164, 168
See application file for complete search history.

(56) References Cited

U.S. PATENT DOCUMENTS

| | | | | |
|---|---|---|---|---|
| 4,386,412 A | * | 5/1983 | Ito ........................... | G06F 15/02 708/136 |
| 4,580,235 A | * | 4/1986 | Yanagawa .............. | G06F 3/0227 708/135 |
| 6,026,449 A | * | 2/2000 | Takenaka ................. | G06F 15/02 708/130 |
| 6,557,018 B1 | * | 4/2003 | Shibasaki ............... | G06F 15/02 708/130 |
| 7,840,899 B2 | * | 11/2010 | Morris ................... | G06F 3/0482 715/721 |
| 8,423,898 B2 | * | 4/2013 | Hale .................... | G06F 3/04886 715/764 |
| 2004/0104945 A1 | * | 6/2004 | Kearns .................... | G06F 15/02 715/853 |

(Continued)

FOREIGN PATENT DOCUMENTS

JP 11066012 A 3/1999
JP 2000132518 A 5/2000

*Primary Examiner* — Matthew D Sandifer
(74) *Attorney, Agent, or Firm* — Holtz, Holtz & Volek PC (57) ABSTRACT

An electronic apparatus includes: a display; a memory; and a processor, wherein the processor is configured to: accept inputs of a plurality of equations in response to a user operation; display, on the display, numerical data of each of calculation results of the plurality of equations respectively; store, in the memory, each of the plurality of equations and the respective numerical data of each of the calculation results corresponding to each of the plurality of equations; accept an input of numerical data to be searched in response to a user operation; search, from the memory, numerical data of the calculation result corresponding to the numerical data to be searched; and display, on the display, an equation corresponding to the searched numerical data of the calculation result.

18 Claims, 6 Drawing Sheets

(56) References Cited

U.S. PATENT DOCUMENTS

2013/0219312 A1* 8/2013 Abi-Saleh ........... G06F 15/0225
715/765

* cited by examiner

| | | | | |
|---|---|---|---|---|
| (A) [AC] | -001- 0. | (K) [AC] | -009- 0. |
| (B) 10+ | 002 ⊞ 10. | (L) 15+ | 010 ⊞ 15. |
| (C) 20+ | 003 30. | (M) 2000+ (ERRONEOUS INPUT OF "20") | 011 ⊞ 2015. |
| (D) 40 | 004 40. | (N) 40 | 012 40. |
| (E) = | 004 ⌸GT 70. | (O) = | 012 ⌸GT 2055. |
| (F) [AC] | -005- 0. | (P) [AC] | -013- 0. |
| (G) 10+ | 006 ⊞ 10. | (Q) 15+ | 014 ⊞ 15. |
| (H) 25- (ERRONEOUS INPUT OF "+") | 007 ⊟ 35. | (R) 40 | 015 40. |
| (I) 45 | 008 GT 45. | (S) = | 015 ⌸GT 55. |
| (J) = | 008 ⌸GT -10. | | |

FIG. 6

| | | | | |
|---|---|---|---|---|
| (A) [AC] | 016 0. | (I) RECORD [△] | 020 RECORD = × 40. |
| (B) 15× | 017 × 15. | (J) [△] | 018 RECORD = 45. |
| (C) 3 | 018 3. | (K) [△] | 015 RECORD = 55. |
| (D) = | 018 =GT 45. | (L) [AC] | RECORD = 0. |
| (E) 20× | 019 × 20. | (M) -10= | RECORD = -10. |
| (F) 2 | 020 GT 2. | (N) [△] | 008 = -10. |
| (G) = | 020 =GT 40. | (O) [▷] | 005 + 0. |
| (H) [GT] | 021 GT 2255. | (P) [▽] | 006 + 10. |

FIG. 7

ELECTRONIC APPARATUS, CALCULATION PROCESSING METHOD, AND RECORDING MEDIUM STORING CALCULATION PROCESSING PROGRAM

FIELD OF THE INVENTION

The present invention relates to an electronic apparatus, a calculation processing method, and a recording medium recording a calculation processing program.

DESCRIPTION OF THE RELATED ART

Conventional electronic desktop calculators (hereinafter referred to as "electronic calculators") include types of electronic calculators that have a calculation record feature for confirming whether the result of, e.g., four arithmetic operations is correct. By the calculation record feature, a numerical value and operator input during execution of ordinary calculation processing are in order stored as a calculation record. After completion of the calculation, the stored numerical value and operator can be displayed in order. A user can confirm the stored numerical value and operator displayed in order and determines, e.g., whether there is an erroneous input for the calculation (see, e.g., JP 11-066012 A).

In this way, the calculation record feature of the conventional electronic calculator displays, in order, a numerical value and operator stored as a calculation record. Therefore, when many numerical values and operators are recorded as a calculation record (the calculation volume is large), a specific calculation requiring confirmation can be assumed, but the content of the aforementioned specific calculation cannot be readily displayed.

For example, in a calculation of a grand total, which is the total of a plurality of calculation results, a numerical value and an operator are stored as a calculation record for each of the plurality of calculations. Even if it is possible to assume that a specific calculation of the plurality of calculation results is an error (e.g., an error in the sign of the calculation result, an error in the number of digits of a numerical value) based on the calculation result of the grand total, the calculation records of the calculations need to be displayed in order, which is laborious.

The present invention is made to address the foregoing problem. According to the present invention, there are provided an electronic apparatus that can readily display the content of a specific calculation from a calculation record, a calculation processing method, and a recording medium recording a calculation processing program.

SUMMARY OF INVENTION

The first aspect of the present invention is summarized by an electronic apparatus including: a display; a memory; and a processor, wherein the processor is configured to: accept inputs of a plurality of equations in response to a user operation; display, on the display, numerical data of each of calculation results of the plurality of equations respectively; store, in the memory, each of the plurality of equations and the respective numerical data of each of the calculation results corresponding to each of the plurality of equations; accept an input of numerical data to be searched in response to a user operation; search, from the memory, numerical data of the calculation result corresponding to the numerical data to be searched; and display, on the display, an equation corresponding to the searched numerical data of the calculation result.

DETAILED DESCRIPTION OF THE INVENTION

Figure 1:
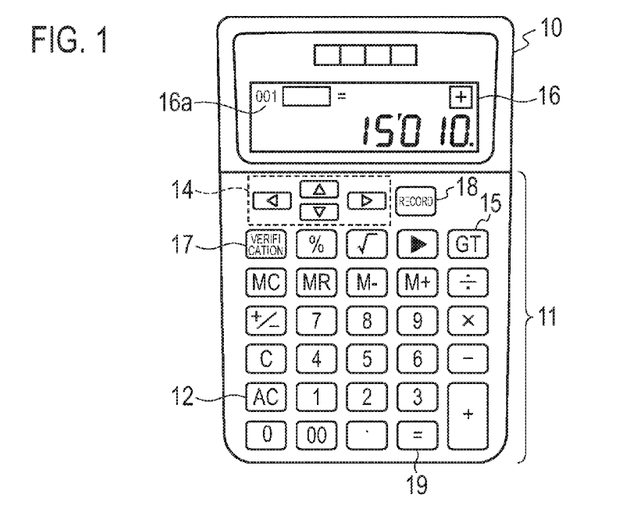
FIG. 1 is a front diagram illustrating an exterior configuration of an electronic calculator according to this embodiment.

An embodiment of the present invention is hereinafter illustrated in reference to the drawings:

FIG. 1 is a front diagram illustrating an exterior configuration of an electronic calculator 10 according to this embodiment of the present invention.

The electronic apparatus is configured as a below-described electronic calculator 10 dedicated to calculation or, e.g., a personal computer, a tablet computer, a smart phone, a cellular phone, a touch-panel personal digital assistant (PDA), an electronic book, or a portable game machine which has a calculation feature (in which a calculation processing program is implemented). An electronic apparatus not mounted with a physical key (button), such as the electronic calculator 10, displays a software keyboard similar to the keys of the electronic calculator 10, so that calculation processing is executed in response to a key operation on this software keyboard.

To address portability, the electronic calculator 10 is made as a small-sized calculator so as to be sufficiently held and operable by one hand of a user. The front surface of the main body of the electronic calculator 10 is provided with a key input unit 11 and a display unit 16.

The key input unit 11 is provided with numerical value keys, operation keys, and functional keys. The numerical value keys include a plurality of keys corresponding to, e.g., [00] and [0] to [9]. The operation keys include a plurality of keys corresponding to, e.g., [+] (addition), [−] (subtraction), [×] (multiplication), [÷] (division), and an equal key ([=] key 19). The functional keys include, e.g., an all clear key ([AC] key 12), clear key ([C] key), a plurality of memory keys ([MC], [MR], [M−], and [M+]), vertical and horizontal direction keys 14 (UP, DOWN, LEFT, and RIGHT keys), a grand total key ([GT] key 15), a root key ([√] key), and a [%] key.

The key input unit 11 of the electronic calculator 10 is provided with a verification key 17 for instructing execution of a verification feature and a record key 18 for instructing viewing of a calculation record by means of a calculation record feature.

The display unit 16 consists of a dot-matrix-type liquid crystal display unit. The display unit 16 displays an equation input in response to a key operation of the key input unit 11. A status display area 16a, which is provided along the upper edge of the display unit 16, displays current settings, including the calculation mode, and a character and symbol indicating the record input row of calculation and verification data.

Figure 2:
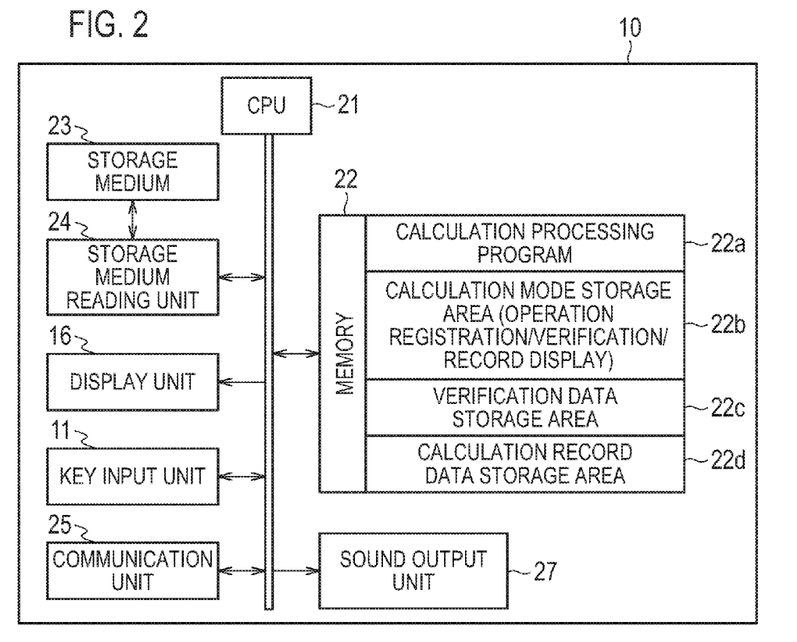
FIG. 2 is a block diagram illustrating a configuration of an electronic circuit of the electronic calculator according to this embodiment.

FIG. 2 is a block diagram illustrating a configuration of an electronic circuit of the electronic calculator 10. The electronic circuit of the electronic calculator 10 includes a plurality of units constituting a computer, including a CPU 21.

By executing a calculation processing program 22a stored in a memory 22, the CPU 21 controls operation of each unit of the circuit and performs various types of operation processing in response to a key input signal from the key input unit 11. The CPU 21 controls operation of each unit of the circuit in accordance with an instruction described in the calculation processing program 22a, and the software and the hardware operate in cooperation with each other, whereby the electronic calculator 10 achieves calculation processing, including processing by the calculation record feature the operation of which is illustrated below.

The calculation processing program 22a may be: in advance stored in the memory 22; read from an external recording medium 23, such as a memory card, via a recording medium reading unit 23; or downloaded from a server on a communication network (including the Internet) via a communication unit 25.

The memory 22 stores the calculation processing program 22a and secures, inter alia, a calculation mode storage area 22b, a verification data storage area 22c, and a calculation record data storage area 22d.

The calculation mode storage area 22b stores mode data indicating one of, e.g.: an operation registration mode for recording data input for ordinary calculation (key code) as a calculation record; a verification mode for performing verification by a verification feature; and a record display mode for displaying a calculation record. The verification data storage area 22c stores calculation data of an equation input for verification during the verification mode. The calculation record data storage area 22d stores calculation data (calculation record data) of an equation input for ordinary calculation in the operation registration mode.

The verification data storage area 22c secures a plurality of record input rows and in order stores, as verification data, a key code input by a key operation by a user for verification calculation. For example, upon operation of a numerical value key, a key code representing a numerical value (numerical value code) is stored as one element. Upon operation of an operation key, a key code representing, e.g., an arithmetic symbol ("+," "−," "×," or "÷") (operation code (operator)) is stored as one element.

The calculation record data storage area 22d secures a plurality of record input rows (e.g., 100 rows). During ordinary calculation (operation registration mode), a key code input by a user key operation is in order stored as calculation record data. For example, upon operation of a numerical key, a key code (numerical code) representing a numerical value is stored as one element. Upon operation of an operation key, a key code (operation code (operator)) indicating, e.g., an arithmetic symbol ("+," "−," "×," or "÷"), is stored as one element. The calculation record data storage area 22d stores data (numerical value) which is a calculation result associated with a key code input by an operation of the [=] key 19. Also, the calculation record data storage area 22d stores data (numerical value) which is a grand total calculation result (total of a plurality of calculations) associated with a key code input by operating the [GT] key 15.

According to this embodiment, when an operation code is input by operating an operation key into the verification data storage area 22c and the calculation record data storage area 22d, the operation code and the numerical value code input prior to the input of the operation code are stored in the same record input row. When a functional key code is input by operating a functional key, such as the [AC] key 12, only the functional key code is stored in the record input row.

The electronic calculator 10 has a sound output unit 27 that outputs various patterns of electronic sound under control of the CPU 21 in accordance with the calculation processing program 22a.

The operation of the electronic calculator 10 according to this embodiment is hereinafter illustrated.

Figure 3:
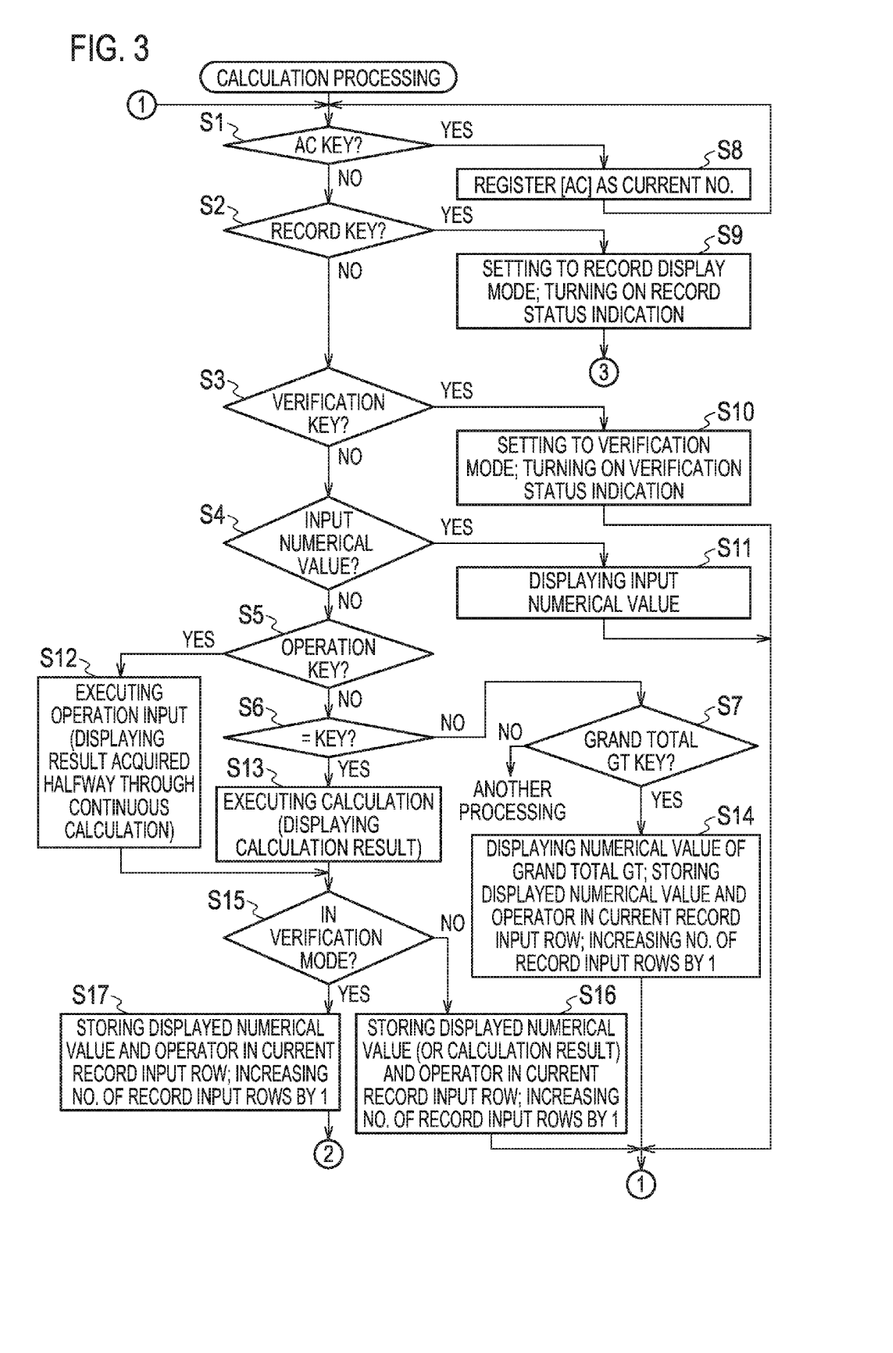
FIG. 3 is a flowchart for calculation processing of the electronic calculator according to this embodiment.
Figure 4A:
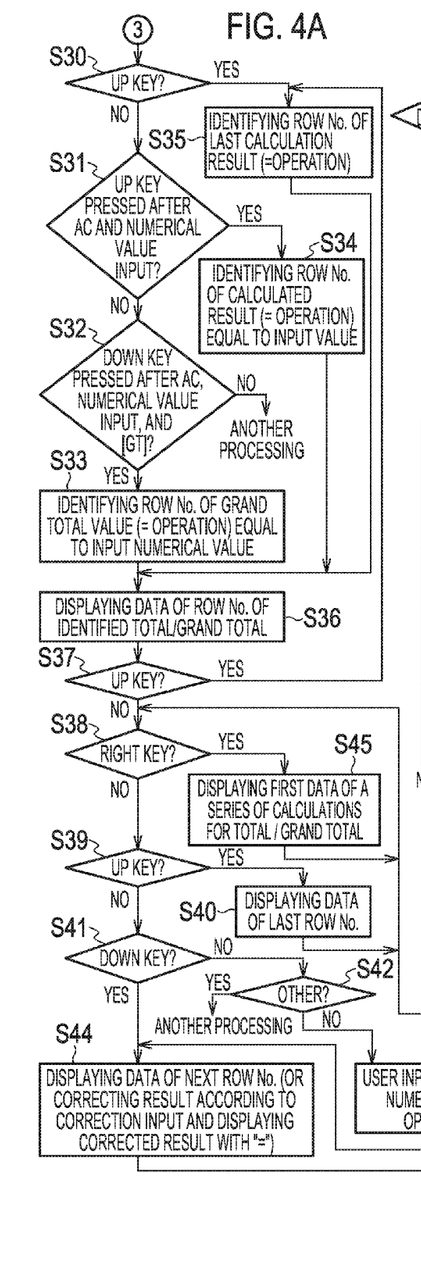
FIG. 4A and FIG.4B are flowcharts for calculation processing of the electronic calculator according to this embodiment.
Figure 4B:
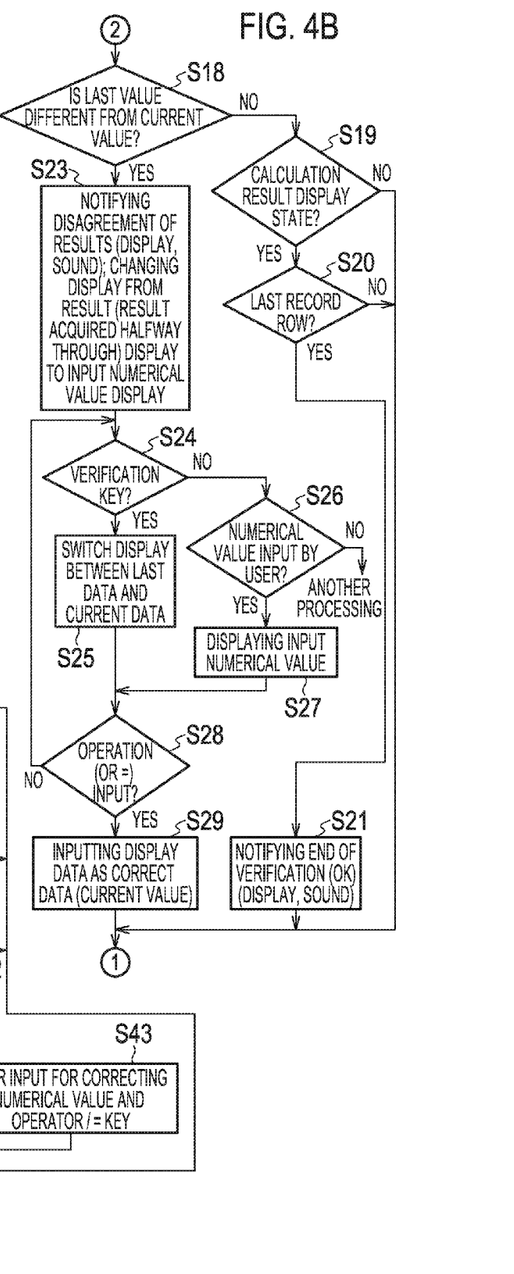
Figure 5:
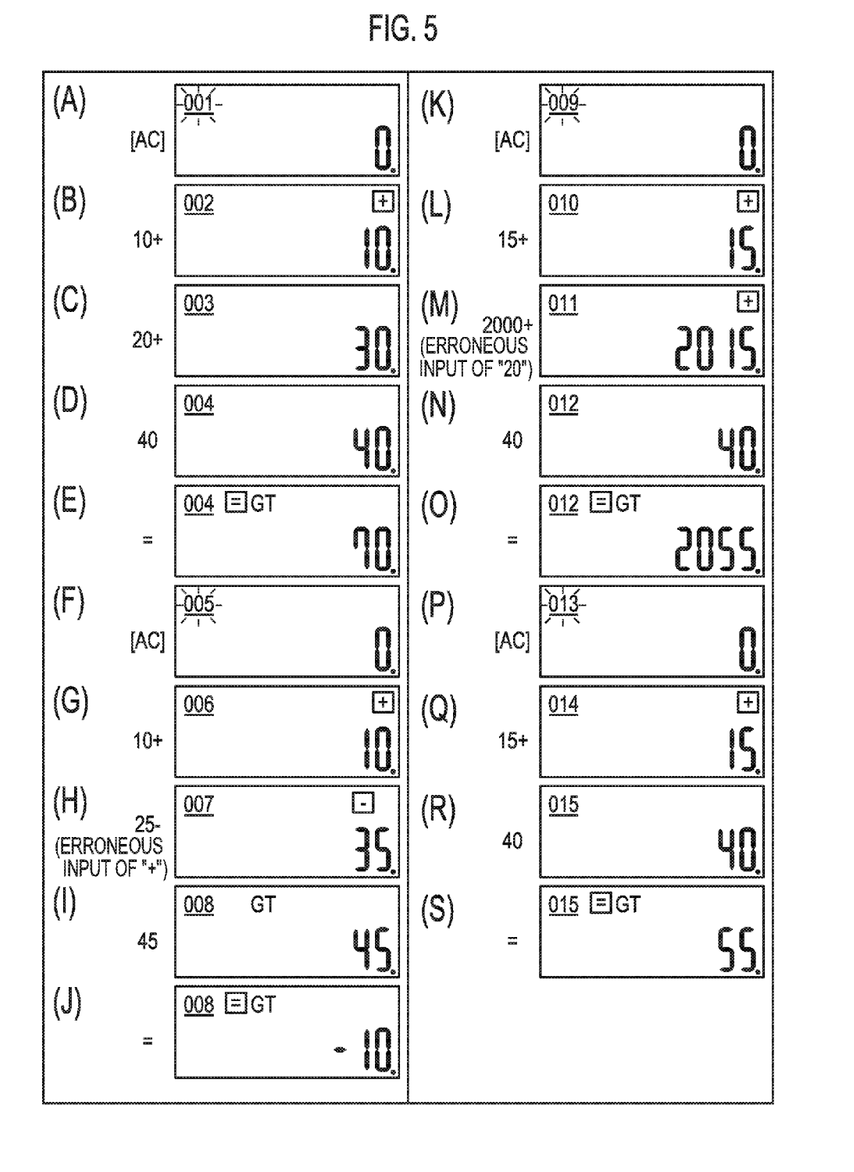
FIG. 5 is a diagram illustrating a specific example of calculation processing of the electronic calculator according to this embodiment.
Figure 6:
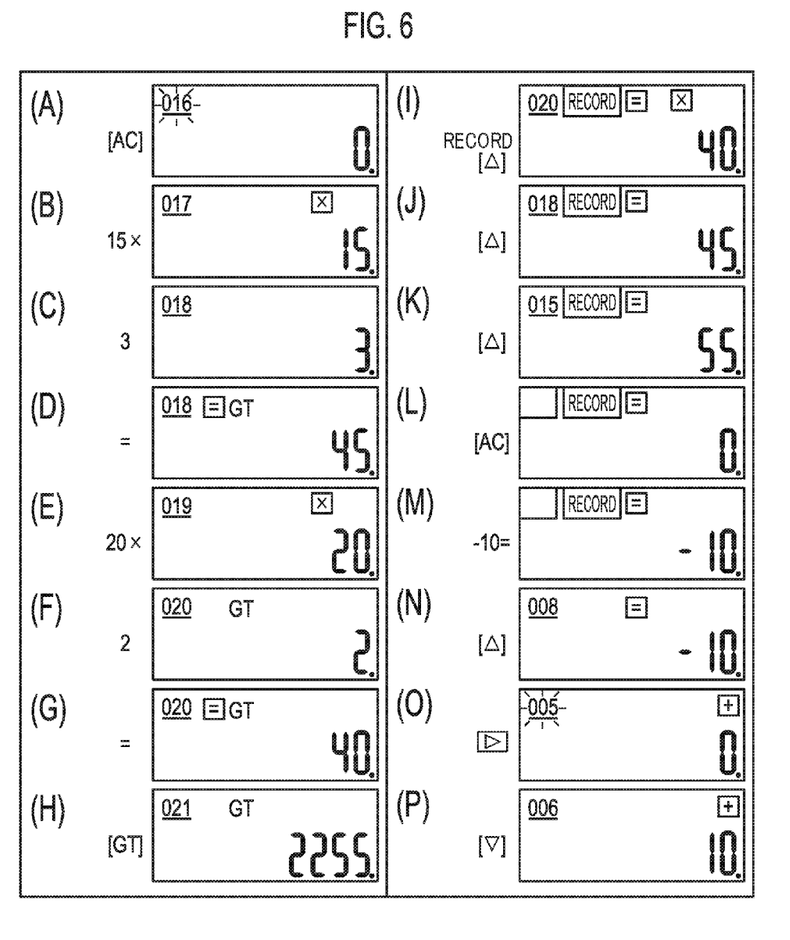
FIG. 6 is a diagram illustrating a specific example of calculation processing of the electronic calculator according to this embodiment.
Figure 7:
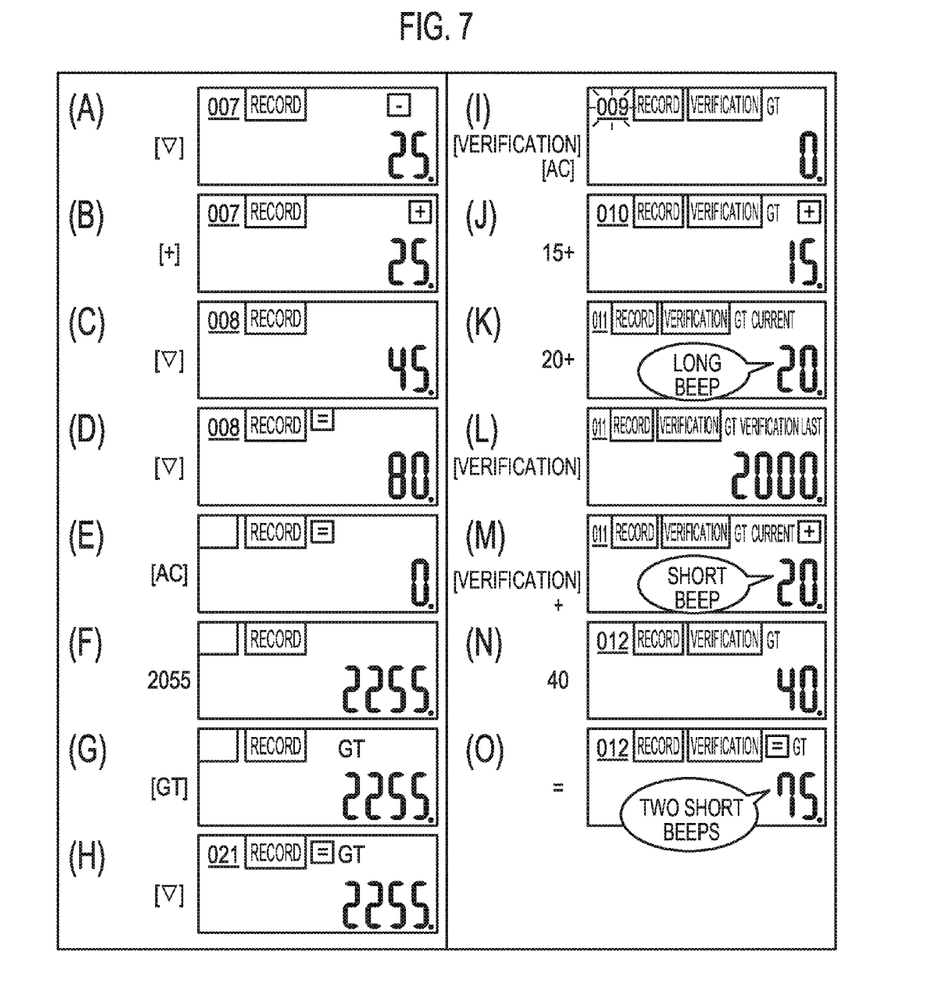
FIG. 7 is a diagram illustrating a specific example of calculation processing of the electronic calculator according to this embodiment.

FIG. 3 and FIGS. 4A and 4B are flowcharts illustrating calculation processing of the electronic calculator 10 according to this embodiment. FIGS. 5, 6, and 7 are diagrams illustrating specific examples of calculation processing of the electronic calculator 10 according to this embodiment.

In reference to FIGS. 5 and 6, recording of a calculation record (calculation record data) is hereinafter illustrated.

To clear the display prior to starting calculation, a user operates (presses) the [AC] key 12. In response to pressing of the [AC] key 12 ("Yes" in step S1), the CPU 21 registers a key code corresponding to the [AC] key 12 based on the current record input row No. indicating the location for inputting calculation data of the calculation record data storage area 22d (record input row) (step S8). The default No. of the record input row is "001."

In turn, when the user operates a numerical value key to input a numerical value for calculation ("Yes" in step S4), the CPU 21 inputs a numerical value (numerical value code) corresponding to the numerical value key by which the input operation has been performed and displays the input numerical value on the display unit 16 (step S11). In response to operation of an operation key ("Yes" in step S5), the CPU 21 inputs an operation (operation code) corresponding to the operation key by which the input operation has been performed and displays an operation symbol of the input operation in the status display area 16a of the display unit 16. While calculation is continuously performed (during calculation), the CPU 21 executes an operation corresponding to the operation code and displays the result on the display unit 16 halfway through the operation (step S12).

While not in the verification mode ("No" in step S15), the CPU 21 stores, in the current record input row of the calculation record data storage area 22d, the numerical value (input numerical value or a numerical value acquired halfway through the calculation) and the operation code displayed on the display unit 16, and in turn the CPU 21 increases the No. of record input rows by 1 for the next input (step S16).

Subsequently, a numerical value code and operation code are repeatedly input in the same way, and the CPU 21 updates the record input row No. and stores the input numerical value code and operation code in order in the record input row.

When the user operates the "=" (equal) key 19 ("Yes" in step S6), the CPU 21 inputs an operation (operation code) corresponding to an operation key ("=" key) by which the input operation has been performed. Calculation is performed based on the numerical value and operation codes that have been input thus far, and the calculation result is displayed on the display unit 16 (step S13). In the current record input row, the CPU 21 stores the numerical value code of the numerical value input immediately before operation of the [=] key 19, the operation code corresponding to the [=] key 19, and the numerical value (numerical value of the calculation result) displayed on the display unit 16. For the next input, the CPU 21 increases the No. of record input rows by 1 (step S16).

Upon operation of the [=] key 19, as described above, while the ongoing calculation is executed, the total of the calculations executed thus far (grand total) is calculated, and the result is stored in a grand total memory area (not shown) of the memory 22. Specifically, the CPU 21 calculates the total of the numerical values of the calculation results stored in record input rows and stores the total together with the operation code of the [=] key 19 of each calculation.

When the user operates the [GT] key 15 ("Yes" in step S7), the CPU 21 inputs an operation (operation code) corresponding to an operation key ([GT] key 15) by which the input operation has been performed. The CPU 21 reads out, from the grand total memory area, the stored calculation result (numerical value of the grand total) calculated in response to the operation of the [=] key 19 and displays the calculation result on the display unit 16. Also, the CPU 21 stores, in the current record input row, the numerical value (numerical value of the grand total) displayed on the display unit 16 and the operation code corresponding to the [GT] key 15. For the next input, the CPU 21 increases the No. of record input rows by 1 (step S14).

FIG. 5 part (A) to part (E) illustrate a display example of performing the following calculation: "10+20+40=70" (hereinafter referred to as "first calculation").

First of all, after clearance by operating the [AC] key 12, as illustrated in FIG. 5 part (A), the CPU 21 displays "0" on the display unit 16 and displays "001," which indicates the row No. of the current record input row, in the status display area 16a. Subsequently, upon input of the numerical value "10" by a numerical value key and an operation code by the "+" key (addition key), as illustrated in FIG. 5 part (B), the CPU 21 displays the input numerical value "10." Also, in the status display area 16a of the display unit 16, the CPU 21 displays "002," which indicates the row No. of the current record input row, and the "+" symbol, which indicates that the addition key has been operated.

Subsequently, upon input of the numerical value "20" and the operation code of the addition key, as illustrated in FIG. 5 part (C), the CPU 21 displays the numerical value "30," which is acquired halfway through the calculation, "003," which indicates the row No. of the record input row, and the "+" symbol. Likewise, upon input of the numerical value "40," as illustrated in FIG. 5 part (D), the CPU 21 displays the input numerical value "40." Upon instruction of execution of the calculation by operating the [=] key 19, as illustrated in FIG. 5 part (E), the CPU 21 displays the numerical value "70," which is the calculation result, and displays the "=" symbol in the status display area 16a. Also, the CPU 21 displays the "GT" mark, which indicates that a grand total is being calculated, in the status display area 16a.

FIG. 5 part (F) to part (J) illustrate a display example subsequent to the first calculation where even though a key operation has been performed with the intention to perform the calculation "10+25+45=80," the unintended calculation "10+25−45=−10" (hereinafter referred to as "second calculation") has been performed by an erroneous input operation of an operation key.

First of all, after clearance by operating the [AC] key 12, as illustrated in FIG. 5 part (F), the CPU 21 displays "0" on the display unit 16 and displays "005," which indicates the row No. of the current record input row, in the status display area 16a. Subsequently, upon input of the numerical value "10" by a numerical value key and an operation code by the "+" key (addition key), as illustrated in FIG. 5 part (G), the CPU 21 displays the input numerical value "10." Also, in the status display area 16a of the display unit 16, the CPU 21 displays "006," which indicates the row No. of the current record input row, and the "+" symbol, which indicates that the addition key has been operated.

Subsequently, upon input of the numerical value "25" and the operation code of the subtraction key, as illustrated in FIG. 5 part (H), the CPU 21 displays the numerical value "35," which is acquired halfway through the calculation, and displays "007," which indicates the row No. of the record input row, and the "−" symbol. In this case, input of the numerical value "25" and operation of the addition key should have been made, but the subtraction key has been erroneously operated.

In turn, upon input of the numerical value "45," as illustrated in FIG. 5 part (I), the CPU 21 displays the input numerical value "45." Upon instruction of execution of the calculation by operating the [=] key 19, as illustrated in FIG. 5 part (J), the CPU 21 displays the numerical value "−10," which is the calculated result, and displays the "=" symbol and the "GT" mark in the status display area 16a. The CPU 21 calculates the total of the first calculation result "70" and the second calculation result "−10," which is "60," and stores the total in the grand total memory area.

Subsequently, FIG. 5 part (k) to part (o) illustrate a display example subsequent to the second calculation where even though a key operation has been performed with the intention to perform the calculation "15+20+40=75," the unintended calculation "15+2000+40=2055" (hereinafter referred to as "third calculation") has been performed by an erroneous input operation of a numerical value key.

After clearance by operating the [AC] key 12, as illustrated in FIG. 5 part (K), the CPU 21 displays "0" in the display unit 16 and displays "009," which indicates the row No. of the current record input row, in the status display area 16a. Subsequently, upon input of the numerical value "15" by a numerical value key and an operation code by the "+" (addition key), as illustrated in FIG. 5 part (L), the CPU 21 displays the input numerical value "15." In the status display area 16a of the display unit 16, the CPU 21 displays "010," which indicates the row No. of the current record input row, and the "+" symbol, which indicates that the addition key has been operated.

Subsequently, upon input of the numerical value "2000" and the operation code of the addition key, as illustrated in FIG. 5 part (M), the CPU 21 displays the numerical value "2015," which is acquired halfway through the calculation, "011," which indicates the row No. of the record input row, and the "+" symbol. Here, input of the numerical value "20" and operation of the addition key should have been made, but the numerical value "2000," the number of digits of which is incorrect, has been erroneously input.

In turn, upon input of the numerical value "40," as illustrated in FIG. 5 part (N), the CPU 21 displays the input numerical value "40." Upon instruction of execution of the calculation by operating the [=] key 19, as illustrated in FIG. 5 part (O), the CPU 21 displays the numerical value "2055," which is the calculation result, and displays the "=" symbol and the "GT" mark in the status display area 16a. The CPU 21 calculates "2155," which is the total of the first to third calculation results, and stores the total in the grand total memory area.

Subsequently, FIG. 5 part (P) to part (S) illustrate a display example subsequent to the third calculation where the calculation "15+40=55" (hereinafter referred to as "fourth calculation") is performed.

After clearance by operating the [AC] key 12, as illustrated in FIG. 5 part (P), the CPU 21 displays "0" on the display unit 16 and displays "013," which indicates the row No. of the current record input row, in the status display area 16a. Subsequently, upon input of the numerical value "15" by a numerical value key and an operation code by the "+" key (addition key), as illustrated in FIG. 5 part (Q), the CPU 21 displays the input numerical value "15." In the status display area 16a of the display unit 16, the CPU 21 displays "014," which indicates the row No. of the current record input row, and the "+" symbol, which indicates that the addition key has been operated.

Subsequently, upon input of the numerical value "40," as illustrated in FIG. 5 part (R), the CPU 21 displays the input numerical value "40." Upon instruction of execution of the calculation by operating the [=] key 19, as illustrated in FIG. 5 part (S), the CPU 21 displays the numerical value "55," which is the calculation result, and displays the "=" symbol and the "GT" mark in the status display area 16a. The CPU 21 calculates the total of the first to fourth calculation results, which is "2170," and stores the total in the grand total memory area.

FIG. 6 part (A) to part (D) illustrate a display example subsequent to the fourth calculation where the calculation "15×3=45" (hereinafter referred to as "fifth calculation") is performed.

After clearance by operating the [AC] key 12, as illustrated in FIG. 6 part (A), the CPU 21 displays "0" on the display unit 16 and displays "016," which indicates the row No. of the current record input row, in the status display area 16a. Subsequently, upon input of the numerical value "15" by a numerical value key and an operation code by the "×" key (multiplication key), as illustrated in FIG. 6 part (B), the CPU 21 displays the input numerical value "15." In the status display area 16a of the display unit 16, the CPU 21 displays "017," which indicates the row No. of the current record input row, and the "×" symbol, which indicates that the multiplication key has been operated.

Subsequently, upon input of the numerical value "3," as illustrated in FIG. 6 part (C), the CPU 21 displays the input numerical value "3." Upon instruction of execution of the calculation by operating the [=] key 19, as illustrated in FIG. 6 part (D), the CPU 21 displays the numerical value "45," which is the calculation result, and displays the "=" symbol and the "GT" mark in the status display area 16a. The CPU 21 calculates the total of the first to fifth calculations, which is "2215," and stores the total in the grand total memory area.

FIG. 6 part (E) to part (G) illustrate a display example subsequent to the fifth calculation where the calculation "20×2=40" (hereinafter referred to as "sixth calculation") is performed.

After operation of the [AC] key 12, upon input of the numerical value "20" by a numerical value key and an operation code by the "×" key (multiplication key), as illustrated in FIG. 6 part (E), the CPU 21 displays the input numerical value "20." Also, the CPU 21 displays "019," which indicates the row No. of the current record input row, and the "×" symbol, which indicates that the multiplication key has been operated, in the status display area 16a.

Subsequently, upon input of the numerical value "2," as illustrated in FIG. 6 part (F), the CPU 21 displays the input numerical value "3". Upon instruction of execution of the calculation by operating the [=] key 19, as illustrated in FIG. 6 part (G), the CPU 21 displays the numerical value "40," which is the calculation result, and displays the "=" symbol and the "GT" mark in the status display area 16a. The CPU 21 calculates the grand total of the first to sixth calculation results, which is "2255," and stores the grand total in the grand total memory area.

Upon operation of the [GT] key 15, the CPU 21 reads out the grand total of the first to sixth calculation results stored in the grand total memory area, which is "2255," and, as illustrated in FIG. 6 part (H), displays the grand total on the display unit 16. In the status display area 16a, the CPU 21 displays only the "GT" mark so as to expressly demonstrate that the grand total is being displayed. Also, in the current record input row, the CPU 21 stores the numerical value of the grand total and the operation code of the [GT] key 15.

When the numerical value of the grand total displayed on the display unit 16 is confirmed to be, e.g., an unexpected numerical value, the user can set the electronic calculator 10 to the record display mode by operating the record key 18 in order to display the calculation records constituting the grand total and confirm, e.g., occurrence of an erroneous input operation.

Display of a calculation record by a calculation record feature is hereinafter illustrated.

For example, when the record key 18 is operated ("Yes" in step S2) in a state where the grand total is displayed (FIG. 6 part (H)), the CPU 21 sets the record display mode and displays the record state indication "record" in the status display area 16a to expressly demonstrate that the current mode is the record display mode (step S9).

In this case, upon operation of, e.g., the UP key of the direction keys 14 (step S30 in FIG. 4A), the CPU 21 identifies the row No. of the record input row storing the last calculation result (step S35). Specifically, the CPU 21 searches the record input rows where the operation code corresponding to the [=] key 19 is stored in descending order starting from the row No. of the current record input row.

Upon identification of the row No. of the record input row storing the last calculation result, the CPU 21 reads out the numerical value of the calculation result from the record input row indicated by the identified row No. and displays the numerical value on the display unit 16 (step S36).

In this case, when the UP key is operated again (step S30), in descending order starting from the row No. of the record input row from which the numerical current calculation value result is read out, the CPU 21 likewise searches the record input row storing the operation code corresponding to the [=] key 19. In turn, the CPU 21 reads out the numerical value of the calculation result from the relevant record input row and displays the numerical value on the display unit 16 (step S36).

Specifically, each time the UP key is operated, the CPU 21 displays the calculation results starting from the last calculation result. Thereby, even when many calculations have been performed, by displaying only the calculation results in order and confirming the results, the user can assume which calculation has been executed by an erroneous input operation.

For example, when there is a calculation result whose value is negative in a situation where no calculation result can be negative, it is possible to assume that the calculation is highly likely to be erroneous. Also, when the number of digits of the numerical value of the calculation result is erroneous (e.g., the calculation result is a four-digit value even when the calculation result should be a two-digit value), it is possible to assume that this calculation is highly likely to be erroneous.

FIG. 6 part (I) illustrates a display example of operating the UP key after the record key 18. The CPU 21 switches the mode to the record display mode in response to operation of the record key 18 and reads out and displays the last calculation result (sixth calculation) (see FIG. 6 part (G)) in response to the operation of the UP key. Likewise, upon operation of the UP key, as illustrated in FIG. 6 part (J), the CPU 21 reads out and displays the calculation result of the fifth calculation (see FIG. 6 part (D)). Also, upon operation of the UP key, as illustrated in FIG. 6 part (K), the CPU 21 reads out and displays the calculation result of the fourth calculation (see FIG. 5 part (S)).

Likewise, by repeatedly operating the UP key, the calculation results of the third to first calculations can be displayed in order. By displaying, e.g., "2055," which is the calculation result of the third calculation (see FIG. 5 part (O)), and "−10," the calculation result of the second calculation (see FIG. 5 part (J)), it is possible to assume that the third calculation and the second calculation are erroneous.

In the above description, calculation results are displayed in the order starting from the last calculation to an older calculation in response to operation of the UP key. For example, a newer calculation result can be displayed first in response to operation of the DOWN key. Specifically, a plurality of calculations results can be confirmed by repeatedly operating the UP and DOWN keys.

After the mode is switched to the record display mode, upon operation of the [AC] key 12, input of a numerical value, and operation of the DOWN key ("Yes" in step S31), the CPU 21 identifies the row No. of the record input row storing the calculation result that is the same as the input numerical value (step S34). Specifically, in descending order starting from the row No. of the current record input row, the CPU 21 searches, from among the record input rows storing the operation code corresponding to the [=] key 19, a record input row storing the same calculation result as the input numerical value. If the CPU 21 cannot identify the row No. of the record input row storing the calculation result that is the same as the input numerical value, then error symbol is displayed on the display unit 16.

Upon identification of the row No. of the record input row storing the same calculation result as the input numerical value, the CPU 21 reads out the numerical value of the calculation result from the record input row indicated by the identified row No. and displays the numerical value on the display unit 16 (step S36).

Specifically, when the user knows which calculation result that is assumedly erroneous, the user can specify the numerical value of the calculation result to search the calculation result. When many calculations have been performed, the user can readily display the relevant calculation result without having to confirm the result of each calculation.

In the event that the DOWN key is operated upon operation of the [AC] key 12, input of a numerical value, and operation of the [GT] key 15 after switching to the record display mode, ("Yes" in step S32), the CPU 21 identifies the row No. of the record input row storing a grand total equal to the input numerical value (step S32). Specifically, in descending order starting from the row No. of the current record input row, the CPU 21 searches, from among the record input rows storing the operation code corresponding to the [GT] key 15, the record input row storing the calculation result (grand total) equal to the input numerical value.

Upon identification of the row No. of the record input row storing the numerical value of the grand total equal to the input numerical value, the CPU 21 reads out the numerical value of the grand total from the record input row indicated by the identified row No. and displays the numerical value on display unit 16 (step S36).

Specifically, when grand total calculation by means of operating the [GT] key 15 is performed a plurality of times, it is possible to specify the numerical value of a grand total to be searched in order to search the grand total. When a plurality of grand totals have been calculated for many calculations, the numerical value of the relevant grand total can be readily displayed without having to confirm the result of each calculation.

By combining operation of the [AC] key 12 and input of a numerical value, e.g., the RIGHT key is operated when the calculation result (total) of a specific calculation or the numerical value of the grand total of a plurality of calculations is displayed on the display unit 16 ("Yes" instep S38). The CPU 21 reads out, from the calculation record data storage area 22d (record input row), data of the front row storing a series of calculation data corresponding to the numerical value of the total or grand total and displays the data on the display unit 16 (step S45).

For example, when the RIGHT key is operated in a state where the calculation result (total) is displayed, the CPU 21 identifies, based on the key code corresponding to the [AC] key 12, the row No. of the front row of the record input rows storing calculation data corresponding to the calculation result and reads out and displays the key code.

For example, when the RIGHT key is operated in a state where the numerical value of the grand total is displayed, the CPU 21 identifies, based on the key code corresponding to the [AC] key 12, the row No. of the front row of the record input rows storing calculation data corresponding to the first calculation of the plurality of calculations from which the grand total has been calculated and reads out and displays the key code.

When the RIGHT key is operated again, the CPU 21 identifies the row No. of the front row storing calculation data of the next calculation (searches the next key code corresponding to the [AC] key 12 in ascending order) and, as described above, displays the data first input for the calculation (numerical value code and operation code). Accordingly, the user can repeat the RIGHT key operation and thereby display the front row data for a plurality of calculations in order.

When, e.g., the UP key is operated in a state where data input for a certain calculation is displayed ("Yes" in step S39), the CPU 21 reads out data (numerical value code and operation code) of the row No. of the row directly in front of the record input row storing the currently displayed data and displays the data on the display unit 16. Accordingly, the user can repeat UP key operation and thereby display data input for the calculation in order.

When, e.g., the DOWN key is operated in a state where data input for a certain calculation is displayed ("Yes" in step S41), the CPU 21 reads data of the row No. on the next row of the record input row storing the currently displayed data and displays the data on the display unit 16 (step S44).

The last record input row storing last data of a series of calculations also stores the numerical value code of the numerical value input immediately before operation of the [=] key 19, the operation code corresponding to the [=] key 19, and the numerical value (numerical value of the calculation result) displayed on the display unit 16. In the last record input row, the CPU 21 displays only the numerical value input immediately before operation of the [=] key 19 in response to operation of the DOWN key. When the DOWN key is operated, the CPU 21 displays the numerical value of the calculation result stored in the last record input row, and the CPU 21 displays the "=" symbol in the status display area 16a to expressly demonstrate that the calculation result is being displayed.

In this way, the user can repeat operation of the DOWN key and thereby display data input for the calculations in the input order.

When a numerical value is input by operating a numerical value key or an operation key is operated in a state where data input for a certain calculation is displayed (step S43), the CPU 21 corrects data (numerical value and operator) in the currently displayed record input row and displays the corrected data on the display unit 16 (step S44). Based on the corrected data, the CPU 21 changes data relating to the calculation data of the series of calculations. Specifically, the CPU 21 executes calculation based on the numerical value or operation code acquired after correcting the operation code and changes the numerical value of the calculation result stored in the record input row together with the operation code corresponding to the [=] key 19.

Specifically, as described above, when the user operates the direction key 14, thereby displays and confirms an optional calculation content on the display unit 16, and detects erroneously input data, the user can immediately correct the calculation data by key operation.

In the record display mode, e.g., when the record key 18 is operated ("Yes" in step S42), the CPU 21 clears the record display mode and returns to the operation registration mode for ordinary calculation.

FIG. 6 part (L) to part (P) and FIG. 7 part (A) to part (D) illustrate a display example of specifying a numerical value to search a calculation result in order to correct calculation data.

Upon operation of the [AC] key 12 in the record display mode, as illustrated in FIG. 6 part (L), the CPU 21 displays the numerical value "0," which indicates a state where a numerical value to be searched can be input. In this case, e.g., upon input of the numerical value "−10," the CPU 21 displays the input numerical value as illustrated in FIG. 6 part (M). Upon operation of the UP key, the CPU 21 searches a calculation result equal to the input numerical value and displays the calculation result as illustrated in FIG. 6 part (N). Here, the calculation result of the second calculation (see FIG. 5 part (J)) is equal to the input numerical value "−10." The CPU 21 displays "−10," which is the calculation result of the second calculation, and "008," which is the row No. of the record input row where this calculation is first displayed.

Upon operation of the RIGHT key in a display state illustrated in FIG. 6 part (N), the CPU 21 reads out the first data in the second calculation and displays the first data as illustrated in FIG. 6 part (O). Specifically, the CPU 21 displays the state of FIG. 5 part (F) arisen by operating the [AC] key 12.

Upon operation of the DOWN key in the display state illustrated in FIG. 6 part (O), the CPU 21 reads out the data of the next row No. of the second calculation and displays the data as illustrated in FIG. 6 part (P). Specifically, the CPU 21 displays the data according to the numerical value "10" and the operation code of the addition key, which are input as illustrated in FIG. 5 part (G). Likewise, upon operation of the DOWN key in the display state illustrated in FIG. 6 part (P), the CPU 21 reads out the data in the next row No. of the second calculation and displays the data as illustrated in FIG. 7 part (A). Specifically, the CPU 21 displays the data according to the numerical value "25" and the operation code of the subtraction key, which are input as illustrated in FIG. 5 part (H).

Here, based on the "−" sign displayed in the status display area 16a, the user can confirm that an erroneous operation occurred since the addition key should have been operated instead. Upon operation of the addition key by the user to correct the calculation in the display status illustrated in FIG. 7 part (A), the CPU 21 corrects the data of the displayed record input row (row No. "007") to the operation code corresponding to the addition key and changes the display of the status display area 16a to the "+" sign as illustrated in FIG. 7 part (B). In this case, the CPU 21 executes calculation based on the corrected calculation data and changes the numerical value of the calculation result.

Upon operation of the DOWN key in the display state illustrated in FIG. 7 part (B), the CPU 21 reads out the data of the next row No. of the second calculation (which is the last row in the series of calculation data) and displays the data as illustrated in FIG. 7 part (C). Specifically, the CPU 21 displays the input numerical value "45" as illustrated in FIG. 5 part (I). Also, upon operation of the DOWN key, as illustrated in FIG. 7 part (D), the CPU 21 displays the numerical value "80," which is the calculation result, and displays the "=" symbol, which corresponds to the [=] key 19, in the status display area 16a.

FIG. 7 part (E) to part (F) illustrate a display example of specifying a numerical value to search a grand total.

Upon operation of the [AC] key 12 in the record display mode, as illustrated in FIG. 7 part (E), the CPU 21 displays the numerical value "0," which indicates a state where a numerical value to be searched can be input. In this case, upon input of, e.g., the numerical value "2255," as illustrated in FIG. 7 part (F), the CPU 21 displays the input numerical value. Upon operation of the [GT] key 15, as illustrated in FIG. 7 part (G), the CPU 21 displays the "GT" mark in the status display area 16a. Thereafter, upon operation of the DOWN key, in descending order starting from the row No. of the current record input row, the CPU 21 searches the numerical value of a grand total equal to the input numerical value "2255." As a result, the value of the grand total in the row No. "021" illustrated in FIG. 6 part (H) is searched. As illustrated in FIG. 7 part (H), the CPU 21 displays "2255," which is the searched numerical value of the grand total, and displays the row No. "021" in the status display area 16a. Also, the CPU 21 displays the "=" symbol and the "GT" mark so as to expressly demonstrate that the numerical value of the grand total is being displayed.

As described above, in the display state illustrated in FIG. 7 part (H), another calculation result can be displayed by specifying a different numerical value, and the calculation results of other calculations can be displayed in order by operating the UP key. Also, depending on the display state of calculation results, the contents of calculation data (numerical value and operator) of a series of calculations can be displayed by operating the RIGHT, UP, or DOWN key and corrected.

Thereby, e.g., when the user searches and displays the calculation result illustrated in FIG. 5 part (O) and confirms in this display state occurrence of the erroneous operation illustrated in FIG. 5 part (M) (input of the numerical value "2000"), the user can input "20," which is the correct numerical value, to correct the calculation data. In this case, a correction is made to not only the calculation result of the corrected calculation data, but also to the grand total (FIG. 6 part (H)) relating to this calculation result.

By making a correction to the erroneous operation of an operation key in the second calculation (FIG. 5 part (H)) and to the error in the numerical value in the third calculation (FIG. 5 part (M)), the CPU 21 corrects the grand total of the first to sixth calculations to the numerical value "365" and stores the corrected value in the grand total memory area.

In the above description, a grand total is searched from among the numerical values calculated in response to a user operation of the [GT] key 15 (FIG. 6 part (H)). By calculating the numerical value of a grand total each time a calculation result is acquired and storing the value in the grand total memory area, the grand total stored in the grand total memory area can be searched. In this case, the CPU 21 may display the numerical value of the grand total searched from the grand total memory area or the calculation result acquired by calculating the searched grand total.

By virtue of the calculation record feature of the electronic calculator 10 according to this embodiment, the results of a plurality of calculations can be searched and displayed. There is no need to display all calculation records in order, and only the calculation content that needs to be confirmed can be readily displayed. After the calculation results are displayed, the numerical value and operation keys input for the calculations can be displayed in order by operating the direction key 14, and occurrence of an erroneous input operation can be found without fail.

Further, the electronic calculator 10 according to this embodiment can search not only the calculation result of each calculation, but also the numerical value of a grand total. By directly specifying the numerical value of a grand total for which occurrence of an erroneous operation needs to be confirmed and displaying the grand total, the calculation contents of the calculations performed to acquire the grand total can be confirmed. When a plurality of grand totals are calculated for a large number of calculations, the grand total containing the calculation content that needs to be confirmed can be readily displayed without having to display all the relevant calculation records in order.

While a calculation record (numerical value and operator) is displayed, by inputting a correct numerical value or operating a correct operation key, the calculation data can be corrected, and the calculation result (or the numerical value of the grand total) can be changed. Accordingly, a calculation error caused by an erroneous input operation can be readily corrected.

Verification by a verification feature is hereinafter illustrated. The electronic calculator 10 according to this embodiment can perform verification processing for a calculation displayed in the record display mode.

Firstly, upon operation of the verification key 17 ("Yes" in step S3), the CPU 21 switches the mode to the verification mode and displays the verification status indication "verification" in the status display area 16a to expressly demonstrate that the current mode is the verification mode (step S10). Also, to input new calculation data for verification in the verification data storage area 22c, the CPU 21 sets the row No. for a new record input indicating the location where a new input record is stored. In the default state, the row No. of the record input row is set to "001."

To verify the previously executed calculation (first calculation), the user starts making an input for the same calculation.

When the user operates a numerical value key to input a numerical value for a calculation to be performed for verification ("Yes" in step S4), the CPU 21 inputs a numerical value (numerical value code) corresponding to the input numerical value key by which the input operation has been performed and displays the input numerical value on the display unit 16. Subsequently, upon operation of an operation key ("Yes" in step S5), the CPU 21 inputs an operation (operation code) corresponding to the operation key by which the input operation has been performed and displays the operation symbol of the input operation in the status display area 16a of the display unit 16. While continuous calculation is performed (during calculation), the CPU 21 executes the operation corresponding to the operation code and displays, in the display unit 16, a result acquired halfway through the calculation (step S12).

In the verification mode ("Yes" in step S15), the CPU 21 stores, in the current record input row of the verification data storage area 22c, the numerical value (input numerical value or numerical value acquired halfway through the calculation) and the operation code displayed in the display unit 16. For the next input, the CPU 21 increases the No. of record input rows by 1 (step S17).

Here, the CPU 21 compares the values (numerical value and operation code) stored in the record input row of the calculation record data storage area 22d in the previous calculation (first calculation) with the values (numerical value and operation code) stored in the record input row of the verification data storage area 22c in the current calculation (second calculation).

Upon determination that the previous calculation value and the current calculation value are different ("Yes" in step S18), the CPU 21 outputs a notification to notify the user that the key operation in the previous calculation is different from the key operation in the current calculation (verification), specifically, the key operation is erroneous (step S23). To output the notification, for example, an indication indicating occurrence of an erroneous key operation can be displayed on the display unit 16, or sound of a specific pattern can be output. The notification can be made either by means of display or sound output. The setting can be made so that the user can select one of the two means in advance.

Also, the CPU 21 changes the result (numerical value indicating a result acquired halfway through the operation) displayed on the display unit 16 back to the input numerical value (step S23).

Here, when the user operates a numerical value key to correct the key operation determined to be erroneous (erroneous numerical value input) ("Yes" in step S26), the CPU 21 inputs a numerical value in response to the operation of the numerical value key and displays the numerical value in the display unit 16 (step S27).

Upon operation of the verification key 17 in the verification mode ("Yes" in step S24), the CPU 21 switches the display between the data (numerical value) input in the previous calculation and the data (numerical value) input in the calculation for this verification (step S25). By operating the verification key 17, the user can display the previous calculation data and the current calculation data and confirm which data is correct.

Upon a user operation of the "=" (equal) key after input of the numerical value that has been determined to be correct by the user ("Yes" in step S28), the CPU 21 inputs the data (numerical value) displayed on the display unit 16 as correct data (current calculation value) (step S29).

The CPU 21 inputs the operation (operation code) corresponding to an operation key ("=" key) by which the input operation has been performed, executes calculation according to the input numerical value code and operation code, and displays the calculation result on the display unit 16. In the current record input row, the CPU 21 stores the numerical value (numerical value of the calculation result) and the operation code being displayed on the display unit 16.

When the equation is long, as described above, a numerical value code and an operation code are repeatedly input. Until operation of the "=" key occurs, the CPU 21 repeats the same processing as the above-described processing for the input numerical value code and operation code.

Upon completion of the verification by operating the "=" key, the CPU 21 clears the verification mode and returns to the ordinary mode for performing ordinary calculation.

The situation where the previous calculation value and the current calculation value are determined to be equal in step S18 of FIG. 4B is hereinafter illustrated.

Upon determination that the previous calculation value and the current calculation value are determined to be equal ("No" in step S18), the CPU 21 proceeds to the next processing since the input data is highly unlikely to be erroneously input data. The CPU 21 determines whether the display unit 16 currently displays the calculation result.

When the display unit 16 does not display the calculation result ("No" in step S19), the CPU 21 determines that the calculation is ongoing and returns to the state of waiting for another key operation.

When the display unit 16 displays the calculation result ("Yes" in step S18), the CPU 21 determines whether the record input row is the last record input row storing the previous calculation data subject to the verification. When the record input row is the last record input row ("Yes" in step S20), the CPU 21 issues a notification to notify the user that the series of calculation operations for the verification has been completed (step S21).

Upon completion of the verification, the CPU 21 clears the verification mode and return to the record display mode.

FIG. 7 part (I) to part (O) are diagrams illustrating a display example in the verification mode.

Here, an example of performing verification for the third calculation illustrated in the FIG. 5 part (K) to part 5(O) is illustrated. For example, when a numerical value is specified to thereby search and display the third calculation result (FIG. 5 part (O)), verification processing for the third calculation is executed by operating the verification key 17.

For example, when the [AC] key 12 is operated subsequent to operation of the verification key 17, the CPU 21 clears the display of the display unit 16 (displays the numerical value "0") and displays "009," which indicates the row No. of the front record input row storing the third calculation data, and the verification status indication "verification" in the status display area 16a.

The user starts an input operation for verifying the third calculation. Upon input of the numerical value "15" by a numerical value key and an operation code by the "+" key (addition key), as illustrated in FIG. 7 part (J), the CPU 21 displays the numerical value "15" on the display unit 16. Also, the CPU 21 displays "010," which indicates the row No. of the current record input row, and the "+" symbol, which indicates that the addition key has been operated, in the status display area 16a. In this case, the input numerical value "15" agrees with the numerical value "15," which is input in the first calculation as illustrated in FIG. 5 part (L), and the CPU 21 determines that the key operation is correct and does not output a notification.

In turn, upon input of the numerical value "20" by a numerical value key and an operation code by the "+" key (addition key), as illustrated in FIG. 7 part (K), the CPU 21 displays the numerical value "20" in the display unit 16. Also, the CPU 21 displays "011," which indicates the row No. of the current record input row, and the "+" symbol, which indicates that the addition key has been operated, in the status display area 16a. In this case, the input numerical value "20" does not agree with the numerical value "2000," which is input in the first calculation as illustrated in FIG. 5 part (M). For example, from the sound output unit 27, the sound of the first pattern "long beep" is output.

By this long beep sound, the user can recognize that the input operations of the last and current calculations are different (an erroneous input operation might have occurred). In this case, upon operation of the verification key 17, as illustrated in FIG. 7 part (L), the CPU 21 displays the numerical value "2000" (FIG. 5 part (M)), which is input in the first (last) calculation, and displays the data status indication "last" in the status display area 16a to expressly demonstrate that the last numerical value is being displayed.

Upon operation of the verification key 17 again, as illustrated in FIG. 7 part (M), the CPU 21 displays the numerical value "20" (FIG. 7 part (K)) input in the second calculation (verification) and displays the data status indication "current" in the status display area 16a to expressly demonstrate that the current numerical value is being displayed.

The user displays the numerical values input in the last and current calculations, and, e.g., upon confirmation that the numerical value "20", which is input for the current verification, is correct, the user operates an operation key (addition key) to determine the input. In response to the operation of the operation key, the CPU 21 inputs, as illustrated in FIG. 7 part (M), the currently displayed data (numerical value "20") as correct data and outputs a notification to notify the user that correction has been completed (e.g., the sound of the second sound pattern, "short beep," which is different from the first sound pattern).

Subsequently, upon input of the numerical value "40" (the same data as the data of the first calculation), as illustrated in FIG. 7 part (N), the CPU 21 displays the input numerical value "40" on the display unit 16. Upon operation of the [=] key 19, as illustrated in FIG. 7 part (O), the CPU 21 displays the numerical value "75," which is the calculation result, and outputs a notification to the user that the verification has been completed (e.g., the sound of the third sound pattern, "two short beeps," which is different from the first sound pattern).

Based on calculation data input in the verification mode, in other words, correction calculation data, the CPU 21 corrects the third calculation data stored in the calculation record data storage area 22d and ends the verification processing for the third calculation.

In this way, the electronic calculator 10 according to this embodiment can verify a calculation searched in the record display mode and correct calculation data during verification processing. Even when a large volume of calculation is performed, the electronic calculator 10 readily reads out the calculation subject to correction and accurately makes a correction by means of verification processing.

The methods described in the embodiment, such as the processing illustrated in the flowcharts of FIGS. 3 and 4, can be, for distribution, stored as a computer-executable program in a recording medium, such as a memory card (ROM card, RAM card, etc.), a magnetic disk (flexible disk, hard disk, etc.), an optical disk (CD-ROM, DVD, etc.), or semi-conductor memory. When a computer reads the program recorded in an external recording medium and the operation of the computer is controlled by the program, the computer can perform processing to execute the same features as the features illustrated in the embodiment.

Data of a program for achieving each method can be transmitted via the network (Internet) in the form of a program code. It is possible to incorporate the program data from a network (Internet)-connected computer (server equipment, etc.) so as to achieve the same features as the aforementioned features of the embodiment.

The present invention is not limited to the embodiment. At a stage of embodying the present invention, the invention can be modified in various manners as long as the modification does not deviate from the main object of the invention. The embodiment contains various stages of the invention. By properly combining a plurality of disclosed constituent elements, various types of inventions can be conceived. For example, certain constituent elements can be deleted from the constituent elements illustrated in the embodiment, and certain constituent element can be combined. As along as the problem to be solved described in the Description is solved and the advantageous effect described in the Description can be produced, a configuration achieved by the aforementioned deletion or combination can be considered the present invention.

The invention claimed is:

1. An electronic apparatus comprising:
   a display;
   a memory; and
   a processor,
   wherein the processor is configured to:
      accept inputs of a plurality of equations including numerical data in response to user operations;
      display, on the display, numerical data of a grand total of calculation results of the plurality of equations;
      store, in the memory, the calculation results corresponding to the plurality of equations;
      search at least one of the calculation results in response to at least one user operation, without searching contents of the plurality of equations;
      display, on the display, the searched at least one of the calculation results;
      compare whether a value of newly input numerical data for recalculation is equal to a value of corresponding input numerical data of the searched at least one of the calculation results; and
      substitute, in the searched at least one of the calculation results, the newly input numerical data for the corresponding input numerical data without inputting any numerical value key again for substitution of the newly input numerical data in response to the comparison determining that the value of the newly input numerical data is not equal to the value of the corresponding input numerical data, and
   wherein the substitution is performed by operating at least one key other than a numerical value key.

2. The electronic apparatus according to claim 1, wherein the processor is further configured to:
   store, in the memory, each numerical value and each operator of an input equation in a user operation order, when one of the plurality of equations is stored in the memory; and
   display each numerical value and each operator stored in the memory in the user operation order in response to user operations, when an equation corresponding to the searched at least one of the calculation results is displayed on the display.

3. The electronic apparatus according to claim 1, wherein the processor is further configured to accept a correction to a displayed equation by numerical data or an operator input in response to a user operation.

4. The electronic apparatus according to claim 1, wherein the processor is further configured to verify a displayed equation based on an equation for verification that is input in response to a user operation.

5. The electronic apparatus according to claim 1, wherein the processor is further configured to display, on the display, the searched at least one of the calculation results in a user operation order in response to the at least one user operation.

6. The electronic apparatus according to claim 1, wherein the processor is further configured to:
   output a notification if the value of the newly input numerical data is not equal to the value of the corresponding input numerical data.

7. The electronic apparatus according to claim 1, wherein the processor is further configured to:
   display the corresponding input numerical data on the display in accordance with a user operation after the determining.

8. The electronic apparatus according to claim 7, wherein the processor is further configured to:
   display, on the display, a mark that indicates that displayed data on the display is the corresponding input numerical data,
   wherein the user operation after the determining is an operation of at least one key other than a numerical value key.

9. A calculation processing method of an electronic apparatus comprising a display, a memory, and a processor, the method comprising:
   accepting inputs of a plurality of equations including numerical data in response to user operations;
   displaying, on the display, numerical data of a grand total of calculation results of the plurality of equations;
   storing, in the memory, the calculation results corresponding to the plurality of equations;
   searching at least one of the calculation results in response to at least one user operation, without searching contents of the plurality of equations;
   displaying, on the display, the searched at least one of the calculation results;
   comparing whether a value of newly input numerical data for recalculation is equal to a value of corresponding input numerical data of the searched at least one of the calculation results; and
   substituting, in the searched at least one of the calculation results, the newly input numerical data for the corresponding input numerical data without inputting any numerical value key again for substitution of the newly input numerical data in response to the comparison determining that the value of the newly input numerical data is not equal to the value of the corresponding input numerical data,
   wherein the substitution is performed by operating at least one key other than a numerical value key.

10. The calculation processing method according to claim 9, wherein the method further comprises:
   storing, in the memory, each numerical value and each operator of an input equation in a user operation order, when one of the plurality of equations is stored in the memory; and
   displaying each numerical value and each operator stored in the memory in the user operation order in response to user operations, when an equation corresponding to the searched at least one of the calculation results is displayed on the display.

11. The calculation processing method according to claim 9, wherein the method further comprises accepting a correction to a displayed equation by numerical data or an operator input in response to a user operation.

12. The calculation processing method according to claim 9, wherein the method further comprises verifying a displayed equation based on an equation for verification that is input in response to a user operation.

13. The calculation processing method according to claim 9, further comprising displaying, on the display, the searched at least one of the calculation results in a user operation order in response to the at least one user operation.

14. A non-transitory computer readable storage medium having stored therein instructions which, when executed by a device comprising a display and a memory, cause the device to:
- accept inputs of a plurality of equations including numerical data in response to user operations;
- display, on the display, numerical data of a grand total of calculation results of the plurality of equations;
- store, in the memory, the calculation results corresponding to the plurality of equations;
- search at least one of the calculation results in response to at least one user operation, without searching contents of the plurality of equations;
- display, on the display, the searched at least one of the calculation results;
- compare whether a value of newly input numerical data for recalculation is equal to a value of corresponding input numerical data of the searched at least one of the calculation results; and
- substitute, in the searched at least one of the calculation results, the newly input numerical data for the corresponding input numerical data without inputting any numerical value key again for substitution of the newly input numerical data in response to the comparison determining that the value of the newly input numerical data is not equal to the value of the corresponding input numerical data,
- wherein the substitution is performed by operating at least one key other than a numerical value key.

15. The non-transitory computer readable storage medium according to claim 14, wherein the instructions, when executed by the device, further cause the device to:
- store, in the memory, each numerical value and each operator of an input equation in a user operation order, when one of the plurality of equations is stored in the memory; and
- display each numerical value and each operator stored in the memory in the user operation order in response to user operations, when an equation corresponding to the searched at least one of the calculation results is displayed on the display.

16. The non-transitory computer readable storage medium according to claim 14, wherein the instructions, when executed by the device, further cause the device to accept a correction to a displayed equation by numerical data or an operator input in response to a user operation.

17. The non-transitory computer readable storage medium according to claim 14, wherein the instructions, when executed by the device, further cause the device to verify a displayed equation based on an equation for verification that is input in response to a user operation.

18. The non-transitory computer readable storage medium according to claim 14, wherein the instructions, when executed by the device, cause the device to display, on the display, the searched at least one of the calculation results in a user operation order in response to the least one user operation.

* * * * *

UNITED STATES PATENT AND TRADEMARK OFFICE
CERTIFICATE OF CORRECTION

PATENT NO. : 10,114,791 B2
APPLICATION NO. : 15/010796
DATED : October 30, 2018
INVENTOR(S) : Toshibumi Takashima It is certified that error appears in the above-identified patent and that said Letters Patent is hereby corrected as shown below:

In the Claims

Column 20, Line 33 (Claim 18, Line 5), after "the" insert --at--.

Signed and Sealed this
Fifth Day of February, 2019

Andrei Iancu
*Director of the United States Patent and Trademark Office*